(12) United States Patent
Tang et al.

(10) Patent No.: US 12,211,122 B2
(45) Date of Patent: Jan. 28, 2025

(54) METHOD AND APPARATUS OF PROCESSING IMAGE, ELECTRONIC DEVICE, AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jinmiao Tang, Beijing (CN); Lirong Xu, Beijing (CN); Guangquan Wang, Beijing (CN); Liguang Deng, Beijing (CN); Shuo Li, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/906,841

(22) PCT Filed: Sep. 24, 2021

(86) PCT No.: PCT/CN2021/120240
§ 371 (c)(1),
(2) Date: Sep. 20, 2022

(87) PCT Pub. No.: WO2023/044731
PCT Pub. Date: Mar. 30, 2023

(65) Prior Publication Data
US 2024/0212230 A1  Jun. 27, 2024

(51) Int. Cl.
*G06T 11/00* (2006.01)
*G06F 3/14* (2006.01)
(Continued)

(52) U.S. Cl.
CPC .............. *G06T 11/001* (2013.01); *G06T 3/40* (2013.01); *G06T 7/0002* (2013.01); *G06T 7/90* (2017.01);
(Continued)

(58) Field of Classification Search
CPC ....... G06T 11/001; G06T 3/40; G06T 7/0002; G06T 7/90; G06T 11/60; G06T 2207/10024; G06T 2210/22; G06F 3/1423
See application file for complete search history.

(56) References Cited

U.S. PATENT DOCUMENTS

| | | | |
|---|---|---|---|
| 6,563,957 B1 | 5/2003 | Li et al. | |
| 2003/0133076 A1* | 7/2003 | Lehmeier | G06T 11/00 351/239 |

(Continued)

FOREIGN PATENT DOCUMENTS

| CN | 1595450 A | 3/2005 |
|---|---|---|
| CN | 102131037 A | 7/2011 |

(Continued)

OTHER PUBLICATIONS

International Search Report and Written Opinion dated Jun. 22, 0222, for corresponding PCT Application No. PCT/CN2021/120240.

(Continued)

*Primary Examiner* — Sing-Wai Wu
(74) *Attorney, Agent, or Firm* — Kinney & Lange, P.A.

(57) ABSTRACT

The present disclosure provides a method of processing an image, which relates to a field of display, in particular to a color image display technology. A specific implementation solution includes: acquiring an original image; performing a first halftone processing on the original image, so as to obtain a first image; and resizing the original image to obtain a resized image and performing a second halftone process- (Continued)

400 ing, in response to detecting a scaling operation on the first image, so as to obtain a second image. The present disclosure further provides an apparatus of processing an image, an electronic device, and a computer readable storage medium.

15 Claims, 9 Drawing Sheets

(51) Int. Cl.
G06T 3/40 (2024.01)
G06T 7/00 (2017.01)
G06T 7/90 (2017.01)
G06T 11/60 (2006.01)

(52) U.S. Cl.
CPC ............ *G06T 11/60* (2013.01); *G06F 3/1423* (2013.01); *G06T 2207/10024* (2013.01); *G06T 2210/22* (2013.01)

(56) References Cited

U.S. PATENT DOCUMENTS

| 2005/0200897 | A1 | 9/2005 | Condon et al. |
| 2005/0248601 | A1* | 11/2005 | Rozzi .................... G06K 15/02 347/15 |
| 2010/0199214 | A1* | 8/2010 | Mikawa .................. G09G 5/14 715/800 |
| 2010/0225669 | A1* | 9/2010 | Park ....................... G09G 5/005 345/698 |
| 2010/0253699 | A1 | 10/2010 | Henerlau et al. |

FOREIGN PATENT DOCUMENTS

| CN | 103179309 A | 6/2013 | |
| CN | 106534610 A | 3/2017 | |
| CN | 111917934 A | 11/2020 | |
| EP | 824246 A2 * | 2/1998 | ............. G06T 7/004 |

OTHER PUBLICATIONS

Floyd, Robert W., et al., "An adaptive Algorithn for Spatial Greyscale", Robert W. Floyd and Louis Steinberg, "An Adaptive Algorithm for Spatial Grayscale", Proceeding of the S.I.D. Vo. 17/2 Second Quarter 1976, pp. 75-77.

Lin, Xia , et al., "Multitoning Technology Application in the Electric Paper Books Display Optimization", Lin et al., Multitoning Technology Application in the Electric Paper Books Display Optimization, http://www.c-s-a.org.cn, Mar. 24, 2015.

Qian, Yang , et al., "Research on Electronic Paper Display System Based on Adaptive Gray Processing Algorithm", Yang Qian, Du Shiyuan, Research on Electronic Paper Display System Based on Adaptive Gray Processing Algorithm, Electric Technology & Software Engineering, pp. 137-139.

* cited by examiner (a)

(b)

(a)

(b)

METHOD AND APPARATUS OF PROCESSING IMAGE, ELECTRONIC DEVICE, AND STORAGE MEDIUM

CROSS REFERENCE TO RELATED APPLICATION(S)

This application is the national phase of PCT application No. PCT/CN2021/120240 filed on Sep. 24, 2021, the contents of which are incorporated herein by reference in their entirety.

TECHNICAL FIELD

The present disclosure relates to a field of display, in particular to a color image display technology and an E-paper technology. More specifically, the present disclosure provides a method and an apparatus of processing an image, an electronic device, and storage medium.

BACKGROUND

With a development of an electronic technology, an E-paper display technology is more and more widely used in daily life and daily work. For an E-paper display that supports multiple colors (such as black and white, and at least one color other than white and black), in order to preserve a color information in a color image to a greatest extent and give full play to a display ability of the E-paper display screen that supports multiple colors, the color image may be converted into a multi-color image.

In a method, when the color image is converted into the multi-color image, if a scaling operation, etc. is performed on the multi-color image, a display effect of the multi-color image on a display screen with a high color gradation may be different from that on an E-paper display screen.

SUMMARY

The present disclosure provides a method and an apparatus of processing an image, an electronic device, and storage medium.

According to a first aspect, a method of processing an image is provided, including: acquiring an original image; performing a first halftone processing on the original image, so as to obtain a first image; and resizing the original image to obtain a resized image and performing a second halftone processing, in response to detecting a scaling operation on the first image, so as to obtain a second image.

According to a second aspect, an apparatus of processing an image is provided, including: an original image acquisition module configured to acquire an original image; a first halftone processing module configured to perform a first halftone processing on the original image, so as to obtain a first image; and a second halftone processing module configured to resize the original image to obtain a resized original image and perform a second halftone processing, in response to detecting a scaling operation on the first image, so as to obtain a second image.

According to a third aspect, an electronic device is provided, including: at least one processor; and a memory coupled to the at least one processor, wherein the memory stores instructions executable by the at least one processor, and the instructions, when executed by the at least one processor, cause the at least one processor to implement the method provided by the present disclosure.

According to a fourth aspect, a non-transitory computer-readable storage medium having computer instructions therein is provided, and the computer instructions are configured to cause a computer to implement the method provided by the present disclosure.

According to a fifth aspect, a computer program product containing a computer program is provided, and the computer program, when executed by a processor, causes the processor to implement the method provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure.

DETAILED DESCRIPTION OF EMBODIMENTS

Figure 1:
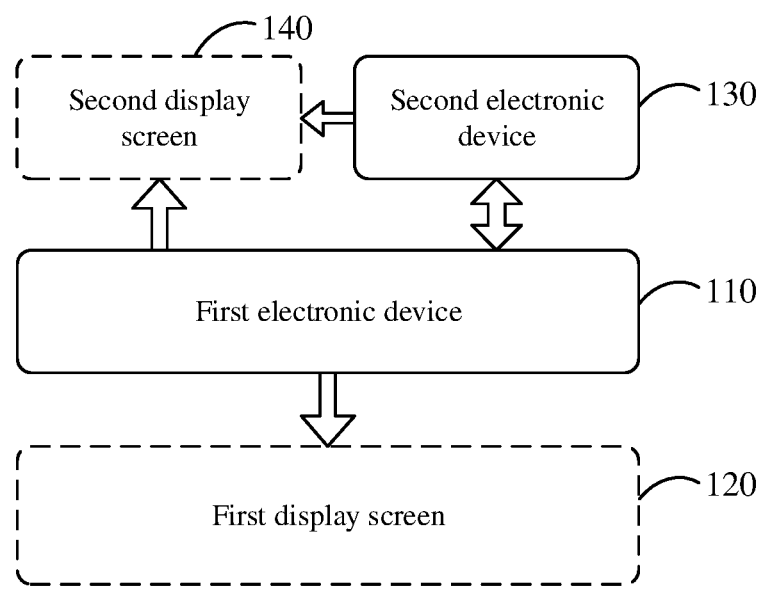
FIG. 1 shows a schematic diagram of an exemplary architecture in which a method and an apparatus of processing an image may be applied according to an embodiment of the present disclosure.

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In order to facilitate the understanding of the technical solution of the present disclosure, some related terms are described first.

E-paper is implemented using an electrophoretic display technology, which consumes power only when refreshing image. After the refresh is completed, the power is off, and the image may still be displayed normally. Common E-paper may only display a few two or three colors such as black and white/black, white and red/black, white and yellow.

Halftone processing is one of necessary technologies for E-paper image display, which refers to quantizing a continuous tone image (such as a grayscale image and a color image), using a small amount of colors, into a binary image or a color image with only a few colors, so as to obtain a quantized image. A visual effect of the quantized image is similar to that of an original image at a certain distance.

With a development of an electronic technology, an E-paper display technology has achieved a rapid development and a wider application in the past few years. For example, E-paper displays are extensively used in some e-book readers, E-paper, shelf labels, e-table cards and other products.

An electrophoretic display (EPD) has become one of the popular research and development technologies of E-paper display due to its superior characteristics. For example, on the one hand, different from a transmissive display, the electrophoretic display is a reflective display, which is more comfortable to read. On the other hand, the electrophoretic display is bistable, which may maintain the display of image when the power is not supplied, and consume power when a user refreshes the image. The electrophoretic display may be mainly divided into a wet-type electrophoretic display and a dry-type quick-response Liquid Powder Display (QR-LPD). The wet-type electrophoretic display may be implemented by Microcapsule or Microcup technology. However, because a display mode of the E-paper display screen is different from that of a traditional liquid crystal display screen, a color gamut of the electrophoretic display is much smaller than that of a Standard RGB (SRGB) color space.

For example, most E-paper display screens may only display a limited number of two or three colors, such as black and white, black, white and red, black, white and yellow, etc.

For a two-color E-paper display screen, a color image needs to be converted to a black and white image. For example, the color image may be binarized according to a threshold, and converted into a binarized black and white image for display on the E-paper display screen.

For a three-color E-paper display screen that may display three colors, an image processor of the E-paper display screen may convert the color image into a halftone image according to a certain algorithm. For example, if an ordinary color image is required to achieve a similar color visual effect on the E-paper display screen, a halftone processing may be firstly performed on the color image so that the color image is quantified into a dot map containing only three colors, where a grayscale of the image is expressed by a density of dots. Due to a low-pass visual characteristic of human eye, the processed image may have a visual effect similar to the original image at a certain distance between the human eye and the E-paper display screen.

When the user edits an image on a high color gradation display screen (such as a liquid crystal display screen, an organic light emitting display screen, a plasma display, or a cathode ray tube display screen, etc.), it may be desired to display the color image being edited on the high color gradation display screen with a display effect of the E-paper display screen, so that the user may view the display effect of the color image being edited that may be exhibited on the E-paper display screen.

However, in an E-paper image editing software, for example, no halftone processing is performed on the image, and only a solid color image without grayscale gradation may be displayed. For example, in the E-paper image editing software, a real-time halftone processing may not be performed on a background image or an inserted image, which may mislead the user into a consideration that the same colorful image may also be displayed on the E-paper. For example, in the E-paper image editing software, the halftone processing may be performed on the original image during insertion, but in the edition, such as a scaling operation of the image, only the processed image is scaled, so that a display effect viewed by the user is different from a display effect of an image with a corresponding size (after scaling) on which the halftone processing is performed.

Specifically, the applicant finds that after the halftone processing is performed on the color image, if the user performs a scaling operation on the processed image, a display effect viewed by the user on the high color gradation display screen is different from a display effect of an image with a corresponding size (after scaling) on which the halftone processing is performed, because a pixel density of the displayed image has changed. Therefore, after a halftone processing and then a scaling processing are performed on an image, a display effect of the image on the E-paper display screen is different from that on the high color gradation display screen.

The technical solution of the present disclosure may be applied to an image editing program to perform a halftone processing on an image (such as a background image or an inserted image, etc.), and perform a halftone processing again when the user performs a scaling operation on the image, so as to ensure that the image viewed by the user is consistent with an image finally refreshed and displayed on the E-paper.

In the technical solution of the present disclosure, an acquisition, a storage and an application of an image information involved are in compliance with the provisions of relevant laws and regulations, and do not violate public order and good customs.

FIG. 1 shows a schematic diagram of an exemplary architecture in which a method and an apparatus of processing an image may be applied according to an embodiment of the present disclosure. It should be noted that FIG. 1 only shows an exemplary architecture to which embodiments of the present disclosure may be applied, so as to help those skilled in the art to understand the technical content of the present disclosure, but it does not mean that embodiments of the present disclosure may not be applied to other devices, systems, environments or scenes.

As shown in FIG. 1, the user may edit a color image using a first electronic device 110. In order to facilitate the user to view an editing effect, the edited color image may be displayed on a first display screen 120. For example, the user may use an image editing program to call a color image to be edited, and the color image to be edited may be displayed on a liquid crystal display screen coupled to the first electronic device 110. The liquid crystal display screen has many color gradations and may display a true color of the color image. The color image to be edited may be an image that needs to be displayed on a second display screen 140 (e.g., a display screen with a few color gradations, such as an E-paper display screen that is illustrated by way of example in the following description). In order to make the visual effect of the image displayed on the E-paper display screen meet the user's expectation, the user may use the image editing program to perform a halftone processing on the color image to be edited, so as to obtain a halftone image, and the halftone image may be displayed on the first display screen 120.

Through the above image processing method, the display effect of the halftone image on the liquid crystal display screen may be kept consistent with the display effect of the color image on the E-paper display screen, so that when editing an image using the first display screen 120, the user may edit the color image according to a display effect of the color image on the E-paper display screen. This may effectively reduce a probability that the user is dissatisfied with the display effect of the edited color image on the E-paper display screen.

In FIG. 1, the second display screen 140 may be coupled to the first electronic device 110, so that the first electronic device 110 may control the second display screen 140 to display the edited image. In addition, the first electronic device 110 may transmit the edited image to a second electronic device 130 coupled to the second display screen 140, so that the second electronic device 130 may control the second display screen 140 to display the edited image.

It may be understood that the first electronic device 110 and the second electronic device 130 are only illustrative examples, and the present disclosure may also be applied to more electronic devices. The first display screen 120 and the second display screen 140 are only illustrative examples, and the present disclosure may also be applied to more display screens.

Figure 2:
FIG. 2 shows a schematic diagram of a display effect of an image without image processing.
Figure 3:
FIG. 3 shows a schematic diagram of a display effect of image processing and E-paper in a related art.
Figure 3:

FIG. 2 shows a schematic diagram of a display effect of an image without image processing. FIG. 3 shows a schematic diagram of a display effect of image processing and E-paper.

A color image without halftone processing (which has been converted to a grayscale image) is shown in FIG. 2, which has rich colors and high definition. (a) of FIG. 3 shows a halftone image after halftone processing by an image editing program, which still has a good display effect although the image has been distorted and the definition is reduced. (b) of FIG. 3 shows a color image displayed by the E-paper display screen. As shown, the display effect in (a) of FIG. 3 is quite different from that in (b) of FIG. 3, so that the user may not view the display effect of the edited image displayed on the E-paper display screen when editing the image on the high color gradation display screen.

Figure 4:
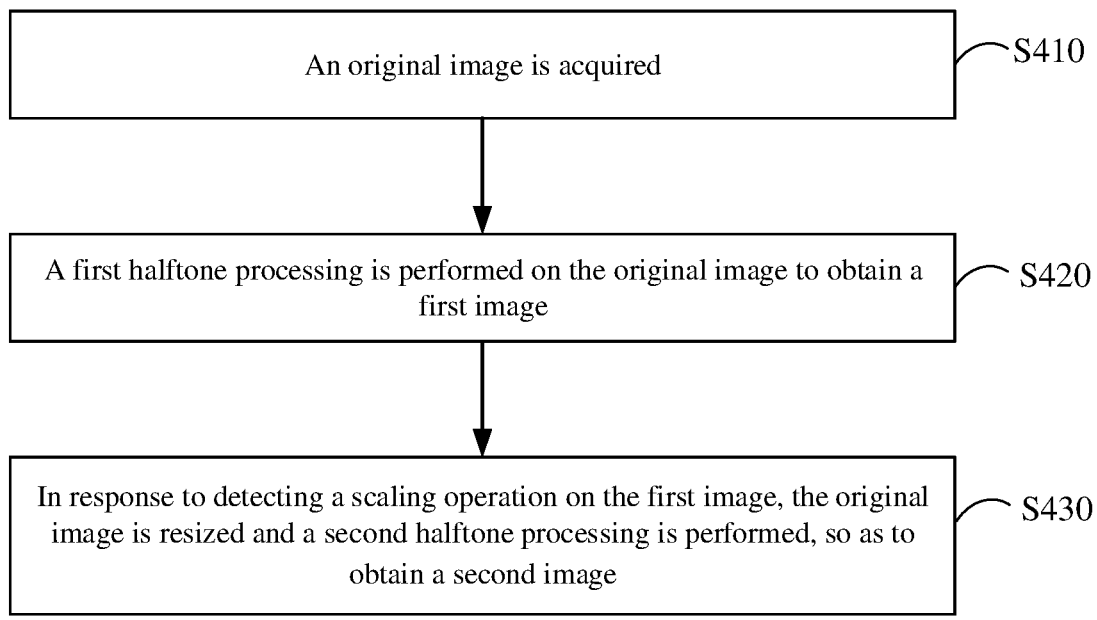
FIG. 4 shows a flowchart of a method of processing an image according to an embodiment of the present disclosure.

FIG. 4 shows a flowchart of a method of processing an image according to an embodiment of the present disclosure.

As shown in FIG. 4, a method 400 of processing an image may include operations S410 to S430.

In operation S410, an original image is acquired.

The original image may be a multi-color image, which may realistically display a color information of a subject. The original image may be an image downloaded from the Internet, an image captured in real time, or an image stored locally.

In some embodiments, the original image may be acquired by the following operations.

First, an image editing template is determined in response to a template acquisition operation for an image editing program. The image editing template may have a specified size, such as 100 pixels×100 pixels, etc. The template acquisition operation may be a click, a slide or other operations for a preset functional component. For example, after opening an E-paper image editing program, the user may move a mouse to a function position for opening image in a function bar, and click a left mouse button to call an image, etc., so as to acquire the image from a local storage space or download the image from a cloud.

Then, in response to an image acquisition operation on the image editing program, the original image is read by the image editing program or a camera component is called to capture the original image. A function of reading the image and calling the camera component to capture will not be described in detail here for conciseness.

Next, the original image is displayed in the image editing template.

In a specific embodiment, the original image may be acquired in three ways as follows. For example, an image selection window may be opened to acquire the image from a local folder. For example, a camera window may be opened to call a camera to take a photo. For example, a uniform resource locator (url) address of a web page image may be entered to download the image from the Internet.

In operation S420, a first halftone processing is performed on the original image to obtain a first image.

In this embodiment, by performing the first halftone processing on the original image, a halftone image may be obtained. A color range of the original image may be greater than or equal to a color range of the first image. The halftone image may be a three-color image, such as containing black, white, and red, or containing black, white, and yellow, or the like.

In operation S430, in response to detecting a scaling operation on the first image, the original image is resized and a second halftone processing is performed, so as to obtain a second image.

A pixel density (Pixels Per Inch, PPI for short) of the first image is consistent with that of the second image. When the scaling operation is performed on the first image, the original image is scaled in equal proportions, and the second halftone processing (an algorithm used in the second halftone processing may be the same as that used in the first halftone processing) is performed on the scaled original image, so that a display effect of the second image is consistent with a display effect of the first image. PPI means a number of pixels per inch. For example, the PPI of the first image may be the same as or similar to the PPI of the second image. For example, a ratio between the PPI of the first image and the PPI of the second image may be less than or equal to a preset threshold. The preset threshold includes but is not limited to 0.1%, 0.5%, 1%, 1.5%, 2%, 3%, 5%, 8%, 10%, or 15%, etc.

In some embodiments, resizing the original image and performing the second halftone processing, in response to detecting the scaling operation on the first image, so as to obtain the second image may include the following operations. For example, in a process of resizing the original image in response to detecting the scaling operation on the first image, if it is detected that a preset refresh condition is met, the second halftone processing is performed on the scaled original image, so as to obtain the second image.

The preset refresh condition may be a preset condition for triggering the second halftone processing. When the preset refresh condition is met, it means that a halftone processing needs to be performed on the image to keep the pixel density of the image consistent.

Specifically, the preset refresh condition may include at least one of: receiving the scaling operation, reaching a preset refresh period, and ending the scaling operation. The preset refresh period may be set by a system, or may be set by the user.

For example, the second halftone processing may be performed after it is determined that the user has completed the scaling operation. For example, if the user moves the mouse to a lower right corner of the image to be scaled and click the left mouse button to perform a sliding operation, it is determined that the user has completed the scaling operation after the user releases the left mouse button, and the second halftone processing is then performed on the scaled original image.

For example, the second halftone processing may be performed while the user is performing the scaling operation. For example, if the user moves the mouse to a lower right corner of the image to be scaled and click the left mouse button to perform a sliding operation, then the second halftone processing may be performed on the scaled original image during a process of the user sliding the mouse. The second halftone processing may be performed on the scaled original image when a change of a position of the mouse is detected. Alternatively, the second halftone processing may be performed on the scaled original image when the left mouse button is pressed for more than a preset duration threshold. The preset duration threshold may be preset by the system or may be user-defined.

It should be noted that, in a process of the user editing the image, the image to be edited may be displayed on the high color gradation display screen. The second image may be displayed on the E-paper display screen with fidelity.

In some embodiments, the first halftone processing and/or the second halftone processing described above may be performed using an electronic device coupled to the high color gradation display screen. The electronic device may include an image processing device, which may be independent or added to the electronic device or a computer system as an additional peripheral element. The image processing device may also be integrated into the electronic device or the computer system.

In some embodiments where the image processing device is a part of the electronic device, a code segment corresponding to the image processing device, as software, may be stored in a memory, and the aforementioned functions are implemented by a processor executing the code segment. Alternatively, the image processing device may contain the aforementioned one or more programs. Still alternatively, the aforementioned one or more programs may include the image processing device.

The E-paper display screen may be an electrophoretic display screen, which may be applied to an electronic device such as e-book reader, E-paper label, e-table card, etc. For example, the E-paper display screen in the present disclosure may be applied to an e-book reader, so that the e-book reader may display a multi-color image to improve a user experience.

In some embodiments, the E-paper display screen may include a processor, which may be a discrete component assembled in a certain way to have an image processing function, or a chip with the aforementioned functions in the form of an integrated circuit, or a computer program code segment that, when running on the processor, enables the E-paper display screen to display the second image.

In some embodiments, the scaling operation on the image may be performed in the following manner.

Specifically, resizing the original image and performing the second halftone processing in response to detecting the scaling operation on the first image may include the following operations.

First, first coordinate values of four vertices of the first image are determined. The coordinate value may be a coordinate value determined with a point of the abovementioned image editing template as a reference point. For example, the reference point may be any one of four vertices of a rectangular image editing template. For example, the reference point may be a center point of a quadrilateral image editing template. For example, the reference point may be a point of the display, such as any one of four vertices of the display, or a center point of the display.

Then, a second coordinate value of a trigger point of the scaling operation is determined in response to the scaling operation on the first image. The trigger point may be a position where the mouse triggers the scaling operation. The trigger point may be a position where a finger triggers the scaling operation on a touch screen. The trigger point may be a position where the user's eyes gaze when the user's eyes trigger the scaling operation (such as blinking three times in rapid succession, etc.).

Next, a difference value between the first coordinate value of an upper left vertex in the four vertices and the second coordinate value of the trigger point is determined.

Then, the original image is resized according to the difference value between the first coordinate value and the second coordinate value.

In addition, the second halftone process may be performed on the resized original image. In this way, when the user performs the scaling operation on the first image, the original image is scaled in equal proportions, so that a size of the second image is consistent with a size expected by the user, and the display effect of the second image is the same as that of the first image.

Figure 5:
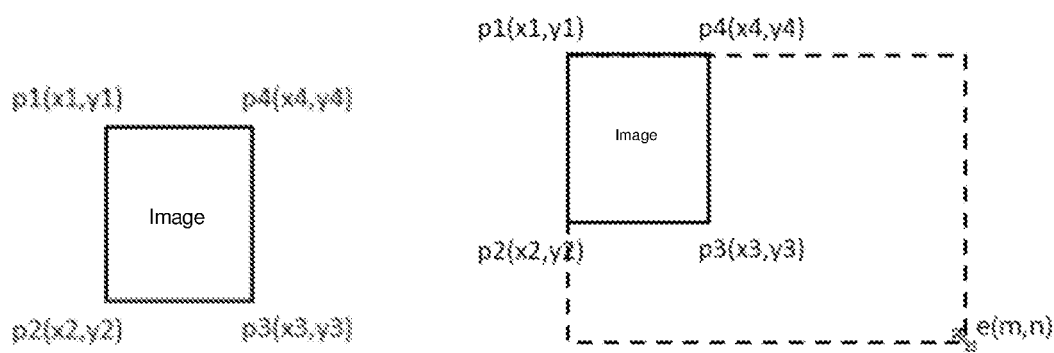
FIG. 5 shows a schematic diagram of performing an image scaling according to an embodiment of the present disclosure.

FIG. 5 shows a schematic diagram of performing image scaling according to an embodiment of the present disclosure.

As shown in FIG. 5, a scaling operation triggered by a mouse is taken as an example for illustration. Firstly, coordinate values p1/p2/p3/p4 of four corners of an image are recorded, where p1 may be expressed as (x1, y1), p2 may be expressed as (x2, y2), p3 may be expressed as (x3, y3), and p4 may be expressed as (x4, y4).

Then, the mouse is placed on an edge or a corner of the image (a mouse position is represented by a value of a variable BorderNum), and the left mouse button is pressed and held to drag, then a background mouse event is triggered, and a coordinate e(m, n) of a point where the mouse is located is recorded in real time. Table 1 shows a mapping relationship between the variable BorderNum and the mouse position.

TABLE 1

Mapping relationship between BorderNum and mouse position

| BorderNum | Mouse Position | BorderNum | Mouse Position |
|---|---|---|---|
| 1 | left | 5 | upper left corner |
| 2 | right | 6 | lower right corner |

TABLE 1-continued

Mapping relationship between BorderNum and mouse position

| BorderNum | Mouse Position | BorderNum | Mouse Position |
|---|---|---|---|
| 3 | top | 7 | lower left corner |
| 4 | bottom | 8 | upper right corner |

In FIG. 5, the mouse is dragged and dropped at the lower right corner, where BorderNum=6, and a difference value between point e and point p1, dx=m−x1, dy=n−y1, may be calculated.

After the difference values dx and dy are obtained, the image may be resized to dx×dy.

It should be noted that the dragging of the mouse is a continuous process, and the above process of resizing the image may also be performed cyclically at a speed of a millisecond level. From the user's point of view, the image continuously changes size as the mouse is dragged. In addition, a halftone processing may be performed on the scaled original image in each cycle at the speed of the millisecond level.

By performing the halftone processing on the original image simultaneously with the image scaling, the following effect may be achieved. If the halftone processing is performed on the image only after the image scaling is performed, the user may not view the display effect of the current scaled image on the E-paper display screen during the image scaling; if the user is not satisfied with the display effect of the image after the halftone processing is performed on the scaled image, the scaling operation needs to be performed again, which causes inconvenience to the operation. If the halftone processing is performed on the image in real time during the image scaling, the user may view the display effect of the current scaled image on the E-paper display screen during the image scaling. Performing the halftone processing on the scaled image in real time may help improve user convenience and reduce a chance of repeated editing.

The method of processing the image provided by embodiments of the present disclosure may be implemented to perform the halftone processing on the image while performing the scaling operation by dragging the edge or corner of the image, which helps to ensure that the display effect of the image displayed to the user is consistent with the display effect of the image displayed on the E-paper.

The following is an exemplary description of a color space conversion and the halftone processing.

In some embodiments, the algorithms employed for the first halftone processing and the second halftone processing may be the same or different.

In some embodiments, performing the second halftone processing on the resized original image so as to obtain the second image may include: firstly converting a color value of a pixel unit in the resized original image into a color value of a target preset color of a preset standard color space, so as to obtain a color-converted original image; and then performing the second halftone processing on the color-converted original image according to an error diffusion algorithm, so as to to obtain the second image.

The error diffusion algorithm, also known as a dithering algorithm, is an algorithm for image halftone processing, which may distribute a quantization error of a central pixel to surrounding adjacent positions that have not been processed, and which is generally used to convert a multi-grayscale-level image into an image with a specified number of grayscale levels, such as a black and white image with two grayscale levels, or a black/white/red image, a black/white/orange image, a black/white/yellow image, a black/white/blue image, a black/white/green image with three grayscale levels, or an image with four or more grayscale levels. The halftone processing may be performed to enhance a border of the image and achieve a better visual effect of the image.

The error diffusion algorithm includes Floyd-Steinberg dithering algorithm, Stucki filter, JF Jarvis dithering algorithm, etc. The Floyd-Steinberg dithering algorithm was proposed by Robert W. Floyd and Louis Steinberg in 1976 and is widely used in image processing tools. The Floyd-Steinberg dithering algorithm may spread a quantized residual of the central pixel to surrounding 4 pixels.

The Floyd-Steinberg dithering algorithm is illustrated below by way of example in describing a process of processing a color image into a three-color image.

In some embodiments, performing the second halftone processing on the color-converted original image according to the error diffusion algorithm so as to obtain the second image may include the following operations.

For each pixel unit in at least some of pixel units in the color-converted original image, an operation of adjusting the color value of the pixel unit to the color value corresponding to the target preset color according to a color error is performed successively to obtain the second image. The color error is an error between a display color of the pixel unit and the target preset color, and the target preset color is a preset standard color with a greatest similarity to the display color of the pixel unit in a plurality of preset standard colors.

The preset standard colors may be a limited number of colors, such as three colors, four colors, five colors, or seven colors. Taking an application scenario of an E-paper display screen that supports three colors of white, black and red as an example, the preset standard colors may be white, black and red. Different colors may be represented by parameters of a RGB color space.

Those skilled in the art may understand that a color space is also called a color model (also known as a color system), which is used to describe colors in a generally acceptable manner under certain standards. The color space may include RGB color space, CMY color space, HSV color space, and HSI color space, etc. It may be understood that a set color space refers to a predefined color space. In this embodiment, the color image needs to be converted into an image with only several colors, so the original color data is converted into corresponding set color data in the set color space, so as to better perform data processing on the color of the pixels.

It should be noted that since the RGB color space is a physical color mode of a display and an image is finally displayed on the display in the RGB color space, original color data of the displayed image for display on the E-paper display screen is RGB color data. That is to say, the original color data of the pixels in the original image is RGB color data. The RGB color space is designed from a principle of color luminescence. The RGB color space may include red, green and blue color channels. Each color is divided into 256 levels of brightness. At level 0, the color channel has a weakest brightness and is in an off state, and at level 255, the color channel has a greatest brightness. When the three colors have the same grayscale value, gray tones with different grayscale values are generated, that is, when the three colors have the grayscale of 0, a darkest black tone is exhibited; when the three colors have the grayscale of 255, a brightest white tone is exhibited. A RGB value refer to the brightness and is represented using integers. Under normal circumstances, each of RGB has 256 levels of brightness, which are represented by numbers 0, 1, 2 . . . 254, 255.

For example, when a high color gradation display screen has a plurality of display units arranged in an array and each display unit may include three pixels (such as a red pixel, a green pixel and a blue pixel), each pixel may have 256 kinds of display brightness. For example, red may be represented by a color value [255,0,0], white may be represented by a color value [255, 255, 255], and black may be represented by a color value [0,0,0]. For convenience, each value in the color value is represented below by a grayscale value.

It should also be noted that the parameters of different color spaces may be converted to each other. For example, in the HSV color space, a saturation S and a lightness V of five colors of red, orange, yellow, green and blue are both 100%. A distribution range of red, orange, yellow, green and blue when both saturation and lightness are 100% may be locked according to an H value. When H=0, it means red; when H=30, it means orange; when H=60, it means yellow; when H=120, it means green; when H=240, it means blue. When 0<H<30, an intermediate color may be obtained by alternating red and orange, and with an increase of the H value, an appearance ratio of red decreases, and an appearance ratio of orange increases. When 30<H<60, the intermediate color may be obtained by alternating orange and yellow, and with the increase of the H value, an appearance ratio of orange decreases, and an appearance ratio of yellow increases. By analogy, the intermediate color of two adjacent colors, that is, an intermediate mixed color of two adjacent colors may be formed by alternating and mixing the two adjacent colors, and a mixing ratio is determined according to a distance of the H value. In addition, as the saturation S decreases, an appearance ratio of white increases, and as the V value decreases, an appearance ratio of black increases. Therefore, a proportion of each standard color in the RGB color space may be calculated according to the hue data H, saturation data S, and lightness data V of the set color, so as to achieve a conversion between the HSV color space and the RGB color space.

In some embodiments, adjusting the color value of the pixel unit to the color value corresponding to the target preset color according to the color error may include the following operations.

Firstly, a similarity between the color value of the pixel unit and the color value of each color in the plurality of preset standard colors is calculated. Specifically, a similarity S between the color value (r, g, b) of the current pixel unit and each of black (0, 0, 0), white (255, 255, 255) and red (255, 0, 0) is calculated respectively. For example, the color value of the current pixel unit is expressed as [r,g,b], and the color value of red is [255,0,0], then the similarity between the color of the current pixel unit and the red color may be determined according to the difference value between [r,g,b] and [255,0,0].

Then, a target preset standard color with a greatest similarity to the color value of the pixel unit is determined from the plurality of preset standard colors, and a difference value between the color value of the pixel unit and the color value of the preset standard color with the greatest similarity is determined. Replacing the color of the current pixel unit with the preset standard color with the greatest similarity may help to maximize a preservation of color information of the color image. For example, the color value of the current pixel may be replaced with a closest color (such as black or white or red).

Next, the color value of the pixel unit is adjusted to the color value corresponding to the target preset standard color. For example, if the color value of the pixel unit is closest to the red color, the color value of the pixel unit may be adjusted to the color value corresponding to the red color. In addition, a difference value between the color value of the pixel unit and the color value of the red color may be obtained. In this way, it is convenient to convert the color image into an image composed of a plurality of standard color pixels, and it is also convenient to spread the difference value to neighboring pixel units of the pixel unit, so as to further improve the display effect. For example, a difference value (that is, an error) between the color value of the pixel unit of the original image and the color value of the replaced preset standard color may be calculated, and may be spread to adjacent pixels in a predetermined proportion.

After performing the above-described three operations on all pixel units one by one in an order from top to bottom and from left to right, the image may be converted into a halftone image, such as a dot map containing black, white and red.

In some embodiments, the pixel unit may include at least two pixels.

Accordingly, calculating the similarity between the color value of the pixel unit and the color value of each of the plurality of preset standard colors may include: for each preset standard color in the plurality of preset standard colors, successively performing the following operations until the difference values for all preset standard colors are calculated.

Firstly, a sub-difference value between a grayscale value of each pixel in the at least two pixels and a corresponding grayscale value of the color value of the preset standard color is calculated respectively. For example, if the color value of the current pixel unit is [125, 200, 100], the sub-difference values between the grayscale values in the color value of the current pixel unit and the grayscale values in the red color value [255, 0, 0] are respectively (125−255), (200−0), (100−0), that is, −130, 200, 100.

Then, the difference value between the color value of the pixel unit and the color value of the preset standard color is determined according to the sub-difference value. Specifically, a square or absolute value of the sub-difference value may be determined to remove an influence of negative numbers. For example, the difference value may be represented by factors [(125−255)×(125−255), (200−0)×(200−0), (100−0)×(100−0)].

Next, the similarity between the color value of the pixel unit and the color value of the preset standard color is determined according to the difference value. For example, the similarity S may be expressed as: (125−255)×(125−255)+(200−0)×(200−0)+(100−0)×(100−0). Then, the similarity between the color of the current pixel unit and the red color may be obtained. The smaller the value calculated by the above formula, the greater the similarity between the two colors. A method of calculating the similarity between the color of the current pixel unit and black or white is similar to the above method, which will not be repeated here. Through the above method, the target preset color of the current pixel unit may be determined, and the difference value between the color value of the current pixel unit and the target preset color, that is, the color error, may be obtained.

In some embodiments, the color error may be diffused into neighboring pixel units of the current pixel unit in the following manner.

For example, the color values of the neighboring pixel units of the pixel unit may be adjusted according to the color error through a filter. The filter may include a target unit and at least two weighting units located in a neighborhood of the target unit. A weight value assigned to each weighting unit in the at least two weighting units is related to a distance and/or relative position between each weighting unit and the target weighting unit, and the weight value is used to weight and assign the color error to the neighboring pixel unit corresponding to the weighting unit to which the weight value belongs.

Specifically, the weight value is determined by using the target weighting unit as a reference point, and is distributed in a descending order from top to bottom in a vertical direction and from left to right in a horizontal direction.

Figure 6:
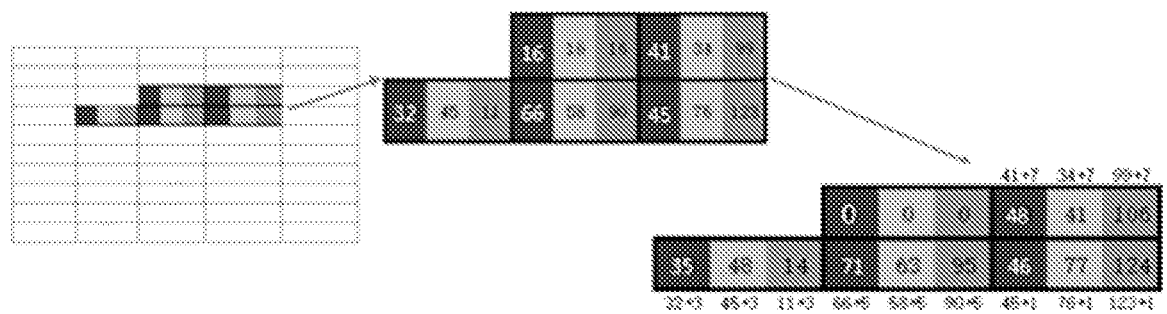
FIG. 6 shows a schematic diagram of a filter according to an embodiment of the present disclosure.

FIG. 6 shows a schematic diagram of a filter according to an embodiment of the present disclosure.

As shown in FIG. 6, a core of the error diffusion algorithm is a filter. A symbol * in FIG. 6 represents the target weighting unit corresponding to the current pixel unit. The error generated after converting the current pixel unit to black or white or red is divided into 16 equal parts, that is, the color error is divided into 16 equal parts. A weight for a weighting unit located on a right side of the target weighting unit is 7 equal parts, a weight for a weighting unit located on a lower side of the target weighting unit is 5 equal parts, a weight for a weighting unit located on a lower left side of the target weighting unit is 3 equal parts, and a weight for a weighting unit located on a lower right side of the target weighting unit is 1 equal part. It should be noted that the above-mentioned method of dividing the error into 16 equal parts is only an example, and the error may also be divided into fewer or more equal parts, such as 32 equal parts, 36 equal parts, etc., according to the image display effect. In addition, the above-mentioned method of diffusing the error to 4 neighboring pixel units is only an example, and the error may also be diffused to 11 neighboring pixel units. For example, the error may be further diffused to 7 pixel units adjacent to the 4 neighboring pixel units of the current pixel unit. The equal parts may be assigned to respective neighboring pixel units according to a rule shown above (with the target weighting unit as the reference point, distributed in a descending order from top to bottom in the vertical direction and from left to right in the horizontal direction), which is not listed here.

Figure 7:
FIG. 7 shows a schematic diagram of an error diffusion process according to an embodiment of the present disclosure.

FIG. 7 shows a schematic diagram of an error diffusion process according to an embodiment of the present disclosure.

As shown in FIG. 7, the color error is divided into 16 equal parts. The pixel unit with a color error [16,16,16] is the current pixel unit, which corresponds to the target weighting unit* of the filter. A weighting unit on a right side of the target weighting unit* has an error diffusion weight of 7, then after the error diffusion, the color value of the pixel unit on the right side of the current unit pixel is adjusted from [41,34,99] to [41+16×7/16,34+16×7/16,99+16×7/16]=[41+7, 34+7,99+7]=[48,41,106]. The method of calculating the color value of other neighboring pixel units after the error diffusion is similar to the above method, which will not be listed here.

Figure 8:
FIG. 8 shows a schematic diagram of a display effect after image processing is performed according to an embodiment of the present disclosure.

FIG. 8 shows a schematic diagram of a display effect after the image processing is performed according to an embodiment of the present disclosure.

As shown in FIG. 8, after the user performs the scaling operation on the halftone-processed image, the display effect is substantially the same as the display effect of (b) in FIG. 3, which effectively improves the user's convenience for editing the image.

In embodiments of the present disclosure, the image may be scaled by dragging the corner of the image. Simultaneously with the scaling operation on the image, a halftone processing may be performed on the image to ensure that the display effect of the image displayed to the user on the high color gradation display screen is consistent with the display effect on the E-paper.

In some embodiments, prior to performing the first halftone processing on the original image, the above method may further include the following operations.

Firstly, a cropping operation on the original image is acquired. Specifically, a preview window is opened in order to receive an image cropping operation.

Then, the original image is cropped in response to the cropping operation on the original image, so as to obtain a cropped third image as the original image or the first image.

Specifically, a corner of a selected part may be dragged to select a desired part.

Figure 9:
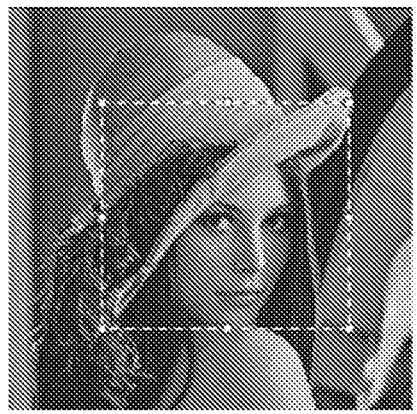
FIG. 9 shows a schematic diagram of an effect of image selection and cropping according to an embodiment of the present disclosure.
Figure 9:
Figure 9:
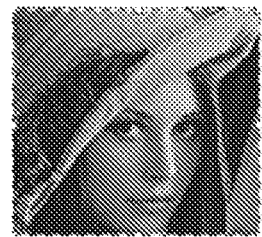
Figure 9:
Figure 9:
Figure 9:

FIG. 9 shows a schematic diagram of an effect of image selection and cropping according to an embodiment of the present disclosure.

As shown in FIG. 9, (a) shows a cropped part containing a face image is cropped from the original image, and (b) shows an example of selecting an entire image of the original image. After completing the image selection and/or cropping, an intercepted image may be saved to a local temporary folder, and a path may be saved to a parameter path.

In some embodiments, subsequent to cropping the original image to obtain the cropped third image, the above method may further include an operation of adjusting an aspect ratio of the third image to the same aspect ratio as the original image or the first image.

Specifically, in order to prevent the image from being too large and exceeding a display range of the window, the aspect ratio of the intercepted image is maintained, and the image is adjusted to a default size (e.g., 100 pixels×100 pixels). For example, the default size may be determined according to a selected image editing template. For example, the default size may be a system default. For example, the default size may be user-set.

In some embodiments, adjusting the aspect ratio of the third image to the same aspect ratio as the original image or the first image may include the following operations.

Firstly, a first width information and a first height information of the third image are determined, and a second width information and a second height information of the original image or the first image are determined. For example, a width of the intercepted image, width0=pixmap·width, and a height of the intercepted image, height0=pixmap·height, may be acquired.

Then, a width scale may be determined according to the first width information and the second width information, and a height scale may be determined according to the first height information and the second height information. For example, a scale of the default size (such as 100 pixels×100 pixels) to the width of the intercepted image, scale_w=100/width0, and a scale of the default size (such as 100 pixels×100 pixels) to the height of the intercepted image, scale_h=100/height0, may be determined Next, a smaller value of the width scale and height scale is determined as the image scale. For example, a smaller one of scale_w and scale_h, expressed as scale=minimum (scale_w, scale_h) is selected.

Then, a third width information corresponding to the first width information is calculated according to the image scale, and a third height information corresponding to the first height information is calculated according to the image scale. For example, a new width newWidth=width0×scale and a new height newHeight=height0×scale of the image may be calculated.

Next, the third image is resized according to the third width information and the third height information. For example, the intercepted image is resized to the new height and width, so that the original aspect ratio of the image is maintained.

By adjusting the above width and height scale, a degree of deformation of a character image, etc. in the intercepted image may be effectively reduced.

Figure 10:
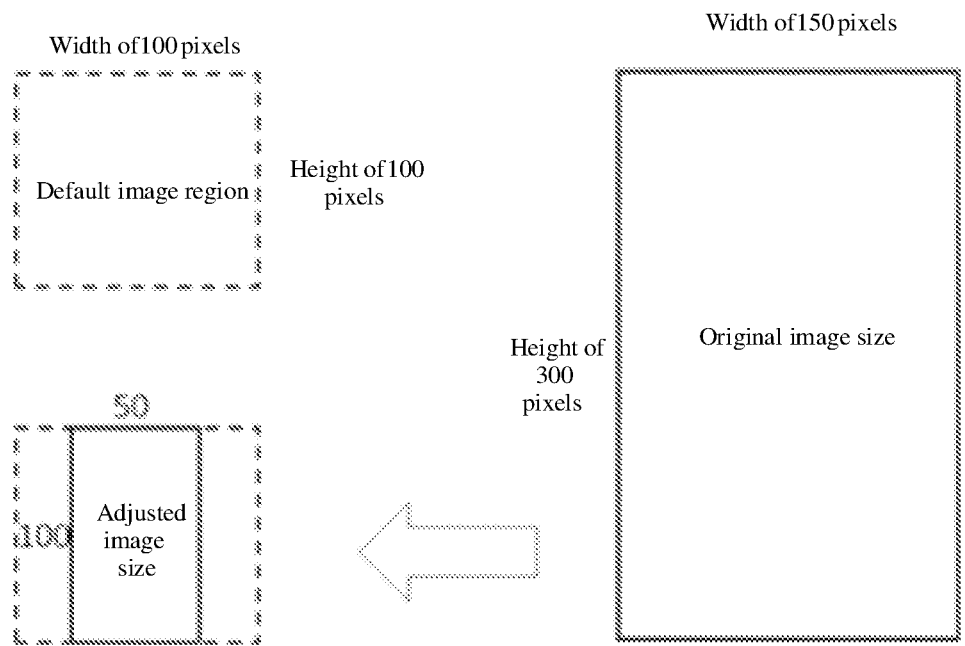
FIG. 10 shows a schematic diagram of resizing an image according to an embodiment of the present disclosure.

FIG. 10 shows a schematic diagram of resizing an image according to an embodiment of the present disclosure.

As shown in FIG. 10, a height scale of the cropped image to the original image is 100/300=⅓, and the width scale is 100/150=⅔. The smaller value of the height scale and the width scale is ⅓. Therefore, ⅓ is determined as the image scale. Accordingly, the new height of the image is 300×⅓=100 (pixels), and the new width of the image is 150×⅓=50 (pixels).

In some embodiments, subsequent to obtaining the second image, the above method may further include the following operations.

Firstly, a region selection operation for an editable region of an image editing template is received.

Then, in response to the region selection operation, a region to be edited is determined from the editable region, and at least a portion of the second image is displayed in the region to be edited.

Next, in response to a scaling operation on the region to be edited, a third halftone process is performed on the image displayed in the region to be edited in a process of scaling the image displayed in the region to be edited. An algorithm of the third halftone processing may be the same as or different from the algorithms of the first halftone processing and the second halftone processing.

In the above manner, the halftone processing may be performed only on the image in the region to be edited selected by the user, which helps to reduce a consumption of computing resources.

In some embodiments, the above method may further include an operation of performing the first halftone processing and/or the second halftone processing, in response to detecting a plurality of overlappingly displayed original images, on an uppermost portion of the overlappingly displayed original images.

Specifically, the halftone processing may be performed only on the uppermost original image of the overlappingly displayed original images, which helps to reduce the consumption of computing resources and energy. It should be noted that, the halftone processing may also be performed on both the uppermost original image and one or more layers of original images located below the uppermost layer in the overlapping display region, which is not limited herein.

In some embodiments, subsequent to obtaining the second image, the above method may further include the following operations.

Firstly, a region selection operation for an editable region of an image editing template is received.

Then, in response to the region selection operation, a region to be edited is determined from the editable region, and at least a portion of the second image is displayed in the region to be edited.

In response to a scaling operation on the region to be edited, a third halftone processing is performed on the image displayed in the editable region in a process of scaling the image displayed in the region to be edited.

In the above manner, the editable region on the entire window (template) may be refreshed, and the halftone processing may be performed on all images, which helps to improve the consistency of display effects (such as pixel density) of all displayed images.

Figure 11:
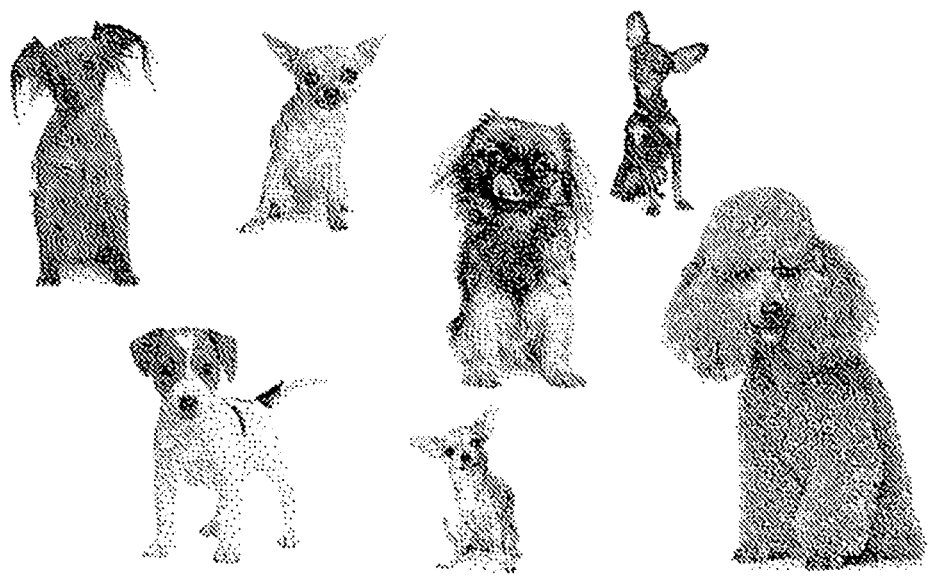
FIG. 11 shows a schematic diagram of displaying an image in an image editing template according to an embodiment of the present disclosure.

FIG. 11 shows a schematic diagram of displaying an image in an image editing template according to an embodiment of the present disclosure.

As shown in FIG. 11, a plurality of images of "pet dog" are added to the image editing template. The halftone processing is performed on each image, so that the images in this image editing template may be displayed on the E-paper display screen with the same display effect.

Figure 12:
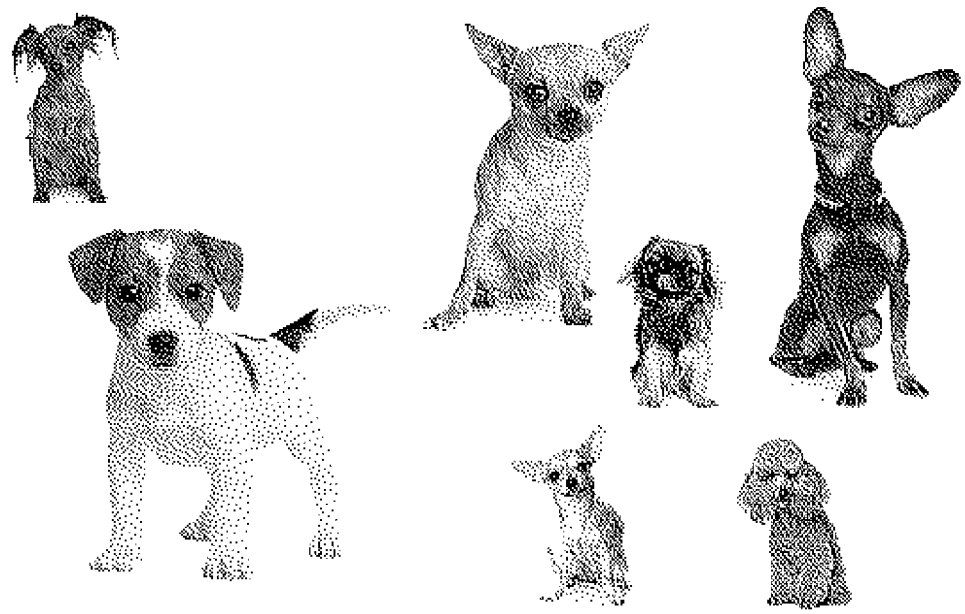
FIG. 12 shows a schematic diagram of editing an image in an image editing template according to an embodiment of the present disclosure.

FIG. 12 shows a schematic diagram of editing an image in an image editing template according to an embodiment of the present disclosure.

Different from FIG. 11, a halftone processing is performed on some of the images of "pet dog" in FIG. 12. For example, the image of "pet dog" in the lower left corner is enlarged and a halftone processing is performed thereon. For example, in the process of enlarging the image of "pet dog" in the lower left corner, the halftone processing may be performed only on the image in the region selected by the user (that is, the image of "pet dog" in the lower right corner). For example, in the process of enlarging the image of "pet dog" in the lower left corner, the halftone processing may be performed on all the images displayed in the image editing template (that is, all the images of "pet dog" in FIG. 12).

In some embodiments, the above method may further include operations of firstly acquiring a text information, and then editing the text information in the editable region of the image editing template.

Figure 13:
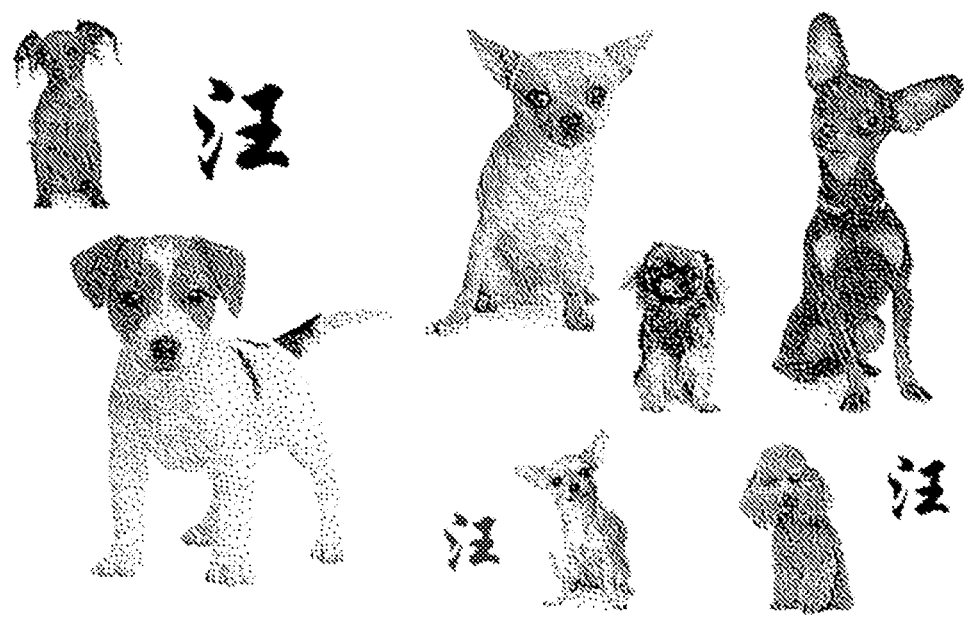
FIG. 13 shows a schematic diagram of adding text in an image editing template according to an embodiment of the present disclosure.

FIG. 13 shows a schematic diagram of adding text in an image editing template according to an embodiment of the present disclosure.

As shown in FIG. 13, the user may add an information such as characters, numbers or symbols to the image editing template, so as to meet user's personalized needs. In FIG. 13, three Chinese characters "汪 (woof)" are added. It should be noted that, the halftone processing may be performed or may not be performed on the image of the added information such as characters, numbers, or symbols.

It should be noted that the user may adjust the brightness and contrast of the image according to individual needs. In addition, the user may insert any number of images in the window of the image editing program, and each image may be dragged to change its position. Specifically, each image may be dragged and/or scaled separately. In addition, text may also be inserted in the window, and the user may edit in the image editing template according to user's ideas.

In some embodiments, subsequent to resizing the original image and performing the second halftone processing so as to obtain the second image, the above method may further include the following operations.

For example, the second image is displayed on a first display screen.

The first display screen includes, but is not limited to, at least one of a liquid crystal display (LCD), a cathode ray tube (CRT) display screen, an organic light emitting diode (OLED) display screen, a light emitting diode (LED) display screen, and a touch screen.

For example, the second image is transmitted to an electronic device coupled to the second display screen, so as to control the second display screen to display the second image. The pixel unit of the second image includes pixels of two colors or pixels of three colors. Colors of the pixels of two colors are respectively the same as colors supported by some pixels in a pixel unit of the second display screen, and colors of the pixels of three colors are respectively the same as colors supported by some pixels in the pixel unit of the second display screen.

The second display screen may be an E-paper display screen.

Referring to FIG. 1, the first electronic device 110 may control the first display screen 120 to display the second image after image processing. In addition, the first electronic device 110 may also control the second display screen 120 (e.g., an E-paper display screen) coupled thereto to display the second image after image processing. In addition, the first electronic device 110 may transmit the second image after image processing to the second electronic device 130, so that the second electronic device 130 may control the second display screen 140 coupled thereto to display the second image after image processing.

The method of processing the image provided by embodiments of the present disclosure enables the first display screen to display the second image with the display effect of displaying the first image on the second display screen, and the number of colors that the first display screen may support is more than the number of colors that the second display screen may display and support.

Figure 14:
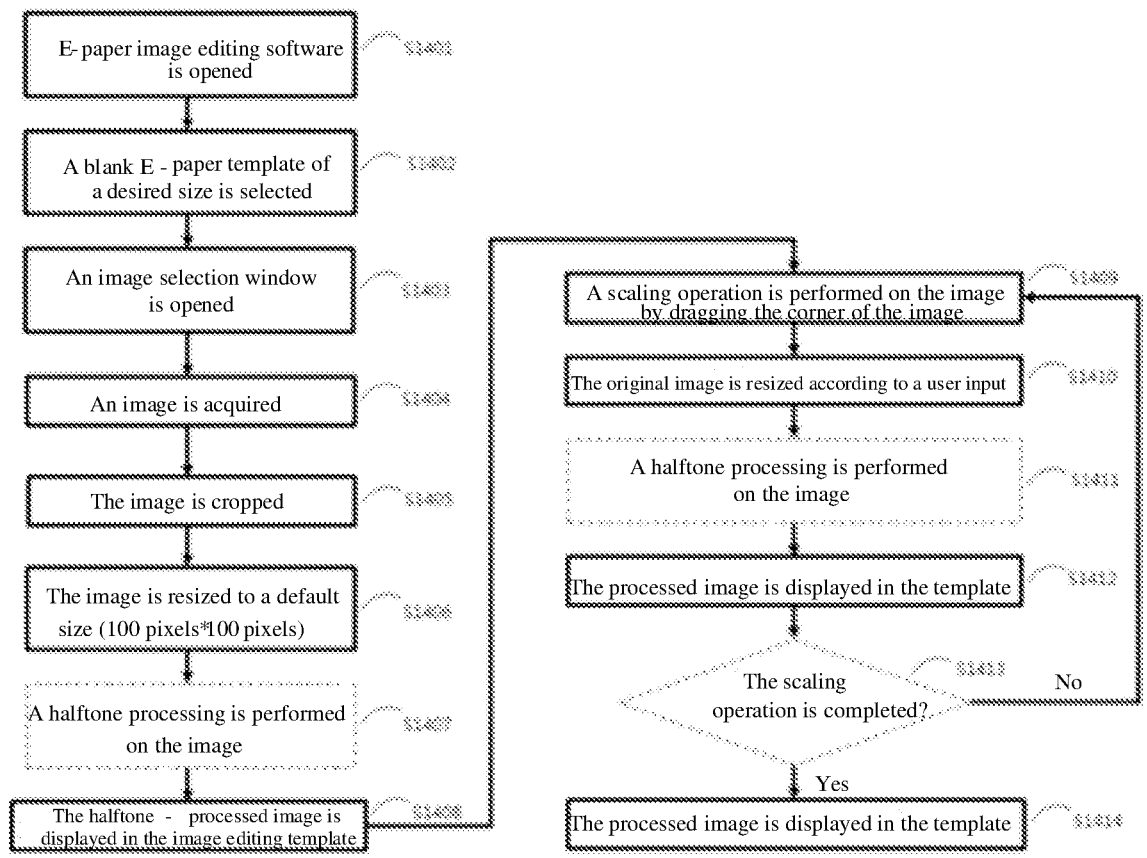
FIG. 14 shows a flowchart of a method of processing an image according to an embodiment of the present disclosure.

FIG. 14 shows a flowchart of a method of processing an image according to an embodiment of the present disclosure.

As shown in FIG. 14, in operation S1401, an E-paper image editing software is opened. In operation S1402, a blank E-paper editing template (image editing template) of a desired size is selected. In operation S1403, an image selection window is opened. In operation S1404, an image is acquired. In operation S1405, the image is cropped to obtain an image to be displayed. In operation S1406, the image is resized to a default size, such as 100 pixels×100 pixels. In operation S1407, a halftone processing is performed on the image by the E-paper image editing software to obtain a halftone-processed image. In operation S1408, the halftone-processed image is displayed in the image editing template. If the user needs to resize the image, in operation S1409, a scaling operation may be performed on the image by dragging the corner of the image. In operation S1410, the image is resized according to a user input. In the process of image scaling, in operations S1411 to S1413, a halftone processing may be performed on the scaled image in real time. For example, when the size of the image changes or when the refresh time period is satisfied, the halftone processing is performed on the scaled image until it is determined that the user has completed the image scaling operation. In operation S1414, the processed image is displayed in the image editing template. In this way, a halftone-processed image with a desired size may be displayed in image editing template.

In the method of processing the image of embodiments of the present disclosure, any number of images may be inserted into the window of the image editing program, and a halftone processing may be performed on the inserted image. In addition, a scaling operation may be performed on the inserted image, for example, by placing the mouse on the corner of the image, pressing the right mouse button and then dragging the mouse to scale the image. In the process of the image scaling, when dragging the mouse, the original image is firstly scaled and then the halftone processing is performed on the scaled image, so that the pixel density displayed by the image is always consistent with that in the image editing template (such as the image editable region located in the window). In this way, the display effect of the processed image on the high color gradation display screen is consistent with the display effect of the image refreshed on the E-paper.

Another aspect of the present disclosure further provides an apparatus of processing an image.

Figure 15:
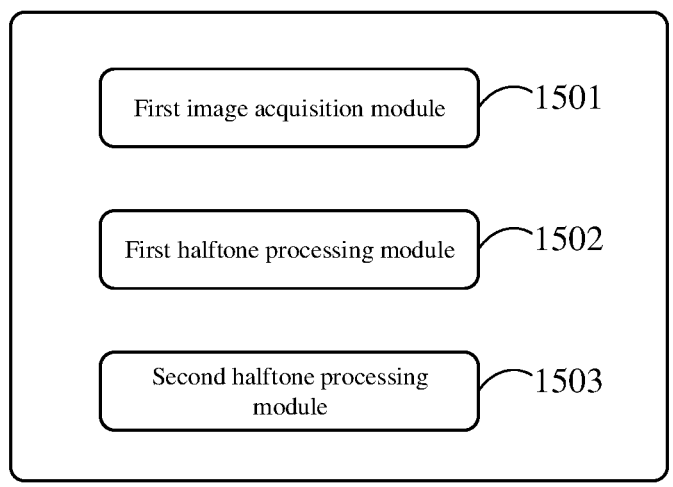
FIG. 15 shows a block diagram of an apparatus of processing an image according to an embodiment of the present disclosure.

FIG. 15 shows a block diagram of an apparatus of processing an image according to an embodiment of the present disclosure.

As shown in FIG. 15, an apparatus 1500 of processing an image may include an original image acquisition module 1510, a first halftone processing module 1520 and a second halftone processing module 1530.

The original image acquisition module 1510 is used to acquire an original image.

The first halftone processing module 1520 is used to perform a first halftone processing on the original image, so as to obtain a first image.

The second halftone processing module 1530 is used to resize the original image to obtain a resized image and performing a second halftone processing, in response to detecting a scaling operation on the first image, so as to obtain a second image. For example, a pixel density of the first image may be the same as or similar to a pixel density of the second image.

According to embodiments of the present disclosure, the second halftone processing module 1530 is specifically used to perform the second halftone processing on the original image, in response to detecting a preset refresh condition being met in a process of resizing the original image in response to detecting the scaling operation on the first image, so as to obtain the second image.

According to embodiments of the present disclosure, the first halftone processing module 1520 and/or the second halftone processing module 1530 may perform the halftone processing according to an error diffusion algorithm.

According to embodiments of the present disclosure, the second halftone processing module 1530 may include a color space conversion unit and an error diffusion unit. The color space conversion unit is used to convert a color value of a pixel unit in the resized original image into a color value of a target preset color in a preset standard color space, so as to obtain a color-converted original image. The error diffusion unit is used to perform the second halftone processing on the color-converted original image according to an error diffusion algorithm, so as to obtain the second image.

According to embodiments of the present disclosure, the color space conversion unit is specifically used to, for each pixel unit in at least some of pixel units in the resized original image, successively perform an operation of adjusting the color value of the pixel unit to the color value corresponding to the target preset color. The color error is an error between a display color of the pixel unit and the target preset color, and the target preset color is a preset standard color with a greatest similarity to the display color of the pixel unit in a plurality of preset standard colors.

According to embodiments of the present disclosure, the color space conversion unit is specifically used to calculate a similarity between the color value of the pixel unit and a color value of each color in a plurality of preset standard colors; determine, from the plurality of preset standard colors, a target preset standard color with a greatest similarity to the color value of the pixel unit; and adjusting the color value of the pixel unit to a color value corresponding to the target preset standard color.

According to embodiments of the present disclosure, the pixel unit includes at least two pixels. Accordingly, the second halftone processing module 1530 is specifically used to, for each preset standard color in the plurality of preset standard colors, perform, successively, operations of: calculating a sub-difference value between a grayscale value of each pixel in the at least two pixels and a corresponding grayscale value in the color value of the preset standard color; determining a difference value between the color value of the pixel unit and the color value of the preset standard color according to the sub-difference value; and determining the similarity between the color value of the pixel unit and the color value of the preset standard color according to the difference value.

According to embodiments of the present disclosure, the preset refresh condition may include at least one of: receiving a scaling operation, reaching a preset refresh period, and ending the scaling operation.

According to embodiments of the present disclosure, the apparatus 1500 may further include: an image cropping module used to, prior to performing the first halftone processing on the original image, acquire a cropping operation on the original image; and crop the original image in response to the cropping operation on the original image, so as to obtain a cropped third image as the original image or the first image.

According to embodiments of the present disclosure, the apparatus 1500 further includes: a height and width adjustment module used to, subsequent to cropping the original image to obtain the cropped third image, adjust an aspect ratio of the third image to a same aspect ratio as the original image or the first image.

According to embodiments of the present disclosure, the height and width adjustment module is specifically used to determine a first width information and a first height information of the third image, and determine a second width information and a second height information of the original image or the first image; determine a width scale according to the first width information and the second width information, and determine a height scale according to the first height information and the second height information; determine a smaller value of the width scale and the height scale as an image scale; calculate a third width information corresponding to the first width information according to the image scale, and calculate a third height information corresponding to the first height information according to the image scale; and resize the third image according to the third width information and the third height information.

According to embodiments of the present disclosure, the original image acquisition module 1510 is specifically used to determine an image editing template in response to a template acquisition operation for the image editing program; acquire the original image or calling a capture component to capture the original image, in response to an image acquisition operation for the image editing program; and display the original image in the image editing template.

According to embodiments of the present disclosure, the apparatus 1500 may further include: a region refresh module used to, subsequent to obtaining the second image, receive a region selection operation for an editable region of the image editing template; determine a region to be edited from the editable region in response to the region selection operation, where at least a portion of the second image is displayed in the region to be edited; and perform a third halftone processing on an original image corresponding to an image displayed in the region to be edited, in a process of scaling the image displayed in the region to be edited in response to a scaling operation on the region to be edited.

According to embodiments of the present disclosure, the apparatus 1500 may further include: an overall refresh module used to, subsequent to obtaining the second image, receive a region selection operation for an editable region of the image editing template; determine a region to be edited from the editable region in response to the region selection operation, where at least a portion of the second image is displayed in the region to be edited; and perform a third halftone processing on an image displayed in the editable region, in a process of scaling the image displayed in the region to be edited in response to a scaling operation on the region to be edited.

According to embodiments of the present disclosure, the apparatus 1500 may further include: an overlapping image processing module used to perform the first halftone processing and/or the second halftone processing, in response to detecting a plurality of overlappingly displayed original images, on an uppermost portion of the overlappingly displayed original images.

According to embodiments of the present disclosure, the apparatus 1500 may further include: a text editing module used to acquire a text information; and edit the text information in the editable region of the image editing template.

According to embodiments of the present disclosure, the second halftone processing module 1530 is further used to: determine first coordinate values of four vertices of the first image; determine a second coordinate value of a trigger point of the scaling operation, in response to the scaling operation on the first image; determine a difference value between the first coordinate value of an upper left vertex in the four vertices and the second coordinate value of the trigger point; resize the original image according to the difference value between the first coordinate value and the second coordinate value; and perform the second halftone processing on the resized original image.

According to embodiments of the present disclosure, the apparatus 1500 may further include an image output module used to: subsequent to resizing the original image to obtain a resized original image and performing the second halftone processing to obtain the second image, display the second image on a first display screen, where a pixel unit of the second image includes pixels of two colors or pixels of three colors, at least one color of the pixels of two colors is different from a color of each pixel in the pixel unit of the first display screen, and at least one color of the pixels of three colors is different from the color of each pixel in the pixel unit of the first display screen; and/or transmit the second image to an electronic device coupled to a second display screen, so as to control the second display screen to display the second image, where a pixel unit of the second image includes pixels of two colors or pixels of three colors, colors of the pixels of two colors are respectively the same as colors supported by some pixels in a pixel unit of the second display screen, and colors of the pixels of three colors are respectively the same as colors supported by some pixels in the pixel unit of the second display screen.

According to embodiments of the present disclosure, the first display screen includes at least one of a liquid crystal display screen, a cathode ray tube display screen, an organic light emitting diode display screen, a light emitting diode display screen, and a touch screen.

According to embodiments of the present disclosure, the second display screen includes E-paper.

Figure 16:
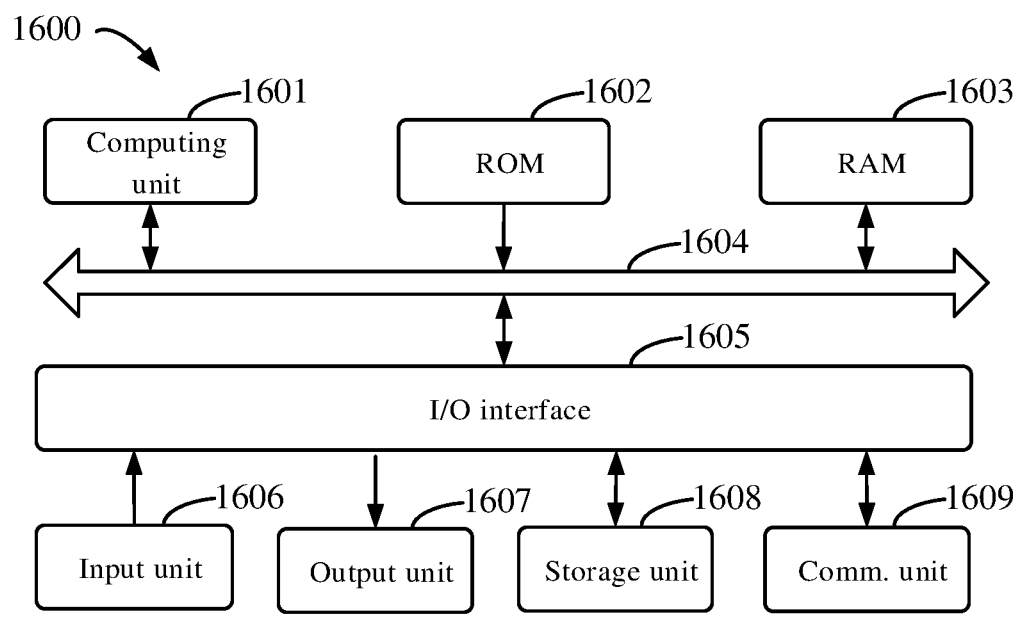
FIG. 16 shows a block diagram of an electronic device for implementing a method of processing an image according to an embodiment of the present disclosure.

FIG. 16 shows a schematic block diagram of an example electronic device 1600 that may be used to implement embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 16, the electronic device 1600 includes a computing unit 1601 which may perform various appropriate actions and processes according to a computer program stored in a read only memory (ROM) 1602 or a computer program loaded from a storage unit 1608 into a random access memory (RAM) 1603. In the RAM 1603, various programs and data necessary for an operation of the device 600 may also be stored. The computing unit 1601, the ROM 1602, and the RAM 1603 are connected to each other through a bus 1604. An input/output (I/O) interface 1605 is also connected to the bus 1604.

A plurality of components in the electronic device 1600 are connected to the I/O interface 1605, including: an input unit 1606, such as a keyboard, or a mouse; an output unit 1607, such as displays or speakers of various types; a storage unit 1608, such as a disk, or an optical disc; and a communication unit 1609, such as a network card, a modem, or a wireless communication transceiver. The communication unit 1609 allows the electronic device 1600 to exchange information/data with other devices through a computer network such as Internet and/or various telecommunication networks.

The computing unit 1601 may be various general-purpose and/or a dedicated processing assemblies having processing and computing capabilities. Some examples of the computing units 1601 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1601 executes various methods and processing described above, such as the method of processing the image. For example, in some embodiments, the method of processing the image may be implemented as a computer software program which is tangibly embodied in a machine-readable medium, such as the storage unit 1608. In some embodiments, the computer program may be partially or entirely loaded and/or installed in the electronic device 1600 via the ROM 1602 and/or the communication unit 1609. The computer program, when loaded in the RAM 1603 and executed by the computing unit 1601, may execute one or more steps in the method of processing the image. Alternatively, in other embodiments, the computing unit 1601 may be configured to execute the method of processing the image by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-described specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing an image, comprising:
acquiring an original image;
performing a first halftone processing on the original image, so as to obtain a first image; and
resizing the original image to obtain a resized image and performing a second halftone processing, in response to detecting a scaling operation on the first image, so as to obtain a second image;
wherein the resizing the original image to obtain a resized image and performing a second halftone processing in response to detecting a scaling operation on the first image so as to obtain a second image comprises:
performing the second halftone processing on the original image, in response to detecting a preset refresh condition being met in a process of resizing the original image in response to detecting the scaling operation on the first image, so as to obtain the second image;
wherein the performing the second halftone processing on the original image, so as to obtain the second image comprises:
converting a color value of a pixel unit in the resized original image to a color value of a target preset color in a preset standard color space, so as to obtain a color-converted original image; and
performing the second halftone processing on the color-converted original image according to an error diffusion algorithm, so as to obtain the second image;
wherein the converting a color value of a pixel unit in the resized original image to a color value of a target preset color in a preset standard color space, so as to obtain a color-converted original image comprises, for each pixel unit in at least some of pixel units in the resized original image, successively performing operations of:
adjusting the color value of the pixel unit to the color value corresponding to the target preset color according to a color error, wherein the color error is an error between a display color of the pixel unit and the target preset color, and the target preset color is a preset standard color with a greatest similarity to the display color of the pixel unit in a plurality of preset standard colors;
wherein the adjusting the color value of the pixel unit to the color value corresponding to the target preset color according to a color error comprises:
calculating a similarity between the color value of the pixel unit and a color value of each color in a plurality of preset standard colors;
determining, from the plurality of preset standard colors, a target preset standard color with a greatest similarity to the color value of the pixel unit; and
adjusting the color value of the pixel unit to a color value corresponding to the target preset standard color; and
wherein the pixel unit comprises at least two pixels, and wherein the calculating a similarity between the color value of the pixel unit and a color value of each color in a plurality of preset standard colors comprises, for each preset standard color in the plurality of preset standard colors, successively performing operations of:
calculating a sub-difference value between a grayscale value of each pixel in the at least two pixels and a corresponding grayscale value in the color value of the preset standard color;
determining a difference value between the color value of the pixel unit and the color value of the preset standard color according to the sub-difference value; and
determining the similarity between the color value of the pixel unit and the color value of the preset standard color according to the difference value.

2. The method of claim 1, wherein the preset refresh condition comprises at least one of: receiving the scaling operation, reaching a preset refresh period, or ending the scaling operation.

3. The method of claim 1, further comprising: prior to performing the first halftone processing on the original image,
acquiring a cropping operation on the original image; and
cropping the original image in response to the cropping operation on the original image, so as to obtain a cropped third image as the original image or the first image.

4. The method of claim 3, further comprising: subsequent to cropping the original image to obtain the cropped third image,
adjusting an aspect ratio of the third image to a same aspect ratio as the original image or the first image.

5. The method of claim 4, wherein the adjusting an aspect ratio of the third image to a same aspect ratio as the original image or the first image comprises:
determining a first width information and a first height information of the third image, and determining a second width information and a second height information of the original image or the first image;
determining a width scale according to the first width information and the second width information, and determining a height scale according to the first height information and the second height information;
determining a smaller value of the width scale and the height scale as an image scale;
calculating a third width information corresponding to the first width information according to the image scale, and calculating a third height information corresponding to the first height information according to the image scale; and resizing the third image according to the third width information and the third height information.

6. The method of claim 1, wherein the acquiring an original image comprises:
determining an image editing template in response to a template acquisition operation;
acquiring the original image or calling a capture component to capture the original image, in response to an image acquisition operation; and
displaying the original image in the image editing template.

7. The method of claim 6, further comprising: subsequent to obtaining the second image,
receiving a region selection operation for an editable region of the image editing template;
determining a region to be edited from the editable region in response to the region selection operation, wherein at least a portion of the second image is displayed in the region to be edited; and
performing a third halftone processing on an original image corresponding to an image displayed in the region to be edited, in a process of scaling the image displayed in the region to be edited in response to a scaling operation on the region to be edited.

8. The method of claim 6, further comprising:
performing the first halftone processing and/or the second halftone processing, in response to detecting a plurality of overlappingly displayed original images, on an uppermost portion of the overlappingly displayed original images.

9. The method of claim 6, further comprising:
acquiring a text information; and
displaying the text information in an editable region of the image editing template.

10. The method of claim 1, wherein the resizing the original image to obtain a resized image and performing a second halftone processing, in response to detecting a scaling operation on the first image comprises:
determining first coordinate values of four vertices of the first image;
determining a second coordinate value of a trigger point of the scaling operation, in response to the scaling operation on the first image;
determining a difference value between the first coordinate value of an upper left vertex in the four vertices and the second coordinate value of the trigger point;
resizing the original image according to the difference value between the first coordinate value and the second coordinate value; and
performing the second halftone processing on the resized original image.

11. The method of claim 1, further comprising: subsequent to resizing the original image to obtain a resized image and performing a second halftone processing so as to obtain a second image,
displaying the second image on a first display screen; and/or
transmitting the second image to an electronic device coupled to a second display screen, so as to control the second display screen to display the second image, wherein a pixel unit of the second image comprises pixels of two colors or pixels of three colors, colors of the pixels of two colors are respectively the same as colors supported by some pixels in a pixel unit of the second display screen, and colors of the pixels of three colors are respectively the same as colors supported by some pixels in the pixel unit of the second display screen.

12. The method of claim 11, wherein the first display screen comprises at least one of a liquid crystal display screen, a cathode ray tube display screen, an organic light emitting diode display screen, a light emitting diode display screen, and a touch screen.

13. The method of claim 11, wherein the second display screen comprises E-paper.

14. An electronic device comprising:
at least one processor; and
a memory coupled to the at least one processor, wherein the memory stores instructions executable by the at least one processor, and the instructions, when executed by the at least one processor, cause the at least one processor to implement a method of processing an image, comprising:
acquiring an original image;
performing a first halftone processing on the original image, so as to obtain a first image; and
resizing the original image to obtain a resized image and performing a second halftone processing, in response to detecting a scaling operation on the first image, so as to obtain a second image;
wherein the instructions are further configured to cause the at least one processor to:
perform the second halftone processing on the original image, in response to detecting a preset refresh condition being met in a process of resizing the original image in response to detecting the scaling operation on the first image, so as to obtain the second image;
convert a color value of a pixel unit in the resized original image to a color value of a target preset color in a preset standard color space, so as to obtain a color-converted original image; and
perform the second halftone processing on the color-converted original image according to an error diffusion algorithm, so as to obtain the second image;
wherein the instructions are further configured to cause the at least one processor to, for each pixel unit in at least some of pixel units in the resized original image, successively perform operations of:
adjusting the color value of the pixel unit to the color value corresponding to the target preset color according to a color error, wherein the color error is an error between a display color of the pixel unit and the target preset color, and the target preset color is a preset standard color with a greatest similarity to the display color of the pixel unit in a plurality of preset standard colors;
wherein the instructions are further configured to cause the at least one processor to:
calculate a similarity between the color value of the pixel unit and a color value of each color in a plurality of preset standard colors;
determine, from the plurality of preset standard colors, a target preset standard color with a greatest similarity to the color value of the pixel unit; and
adjust the color value of the pixel unit to a color value corresponding to the target preset standard color; and
wherein the pixel unit comprises at least two pixels, and wherein the instructions are further configured to cause the at least one processor to, for each preset standard color in the plurality of preset standard colors, successively perform operations of:

calculating a sub-difference value between a grayscale value of each pixel in the at least two pixels and a corresponding grayscale value in the color value of the preset standard color;

determining a difference value between the color value of the pixel unit and the color value of the preset standard color according to the sub-difference value; and determining the similarity between the color value of the pixel unit and the color value of the preset standard color according to the difference value.

15. A non-transitory computer-readable storage medium having computer instructions therein, wherein the computer instructions are configured to cause a computer to implement the method of processing an image, comprising:

acquiring an original image;

performing a first halftone processing on the original image, so as to obtain a first image; and resizing the original image to obtain a resized image and performing a second halftone processing, in response to detecting a scaling operation on the first image, so as to obtain a second image;

wherein the computer instructions are further configured to cause the computer to:

perform the second halftone processing on the original image, in response to detecting a preset refresh condition being met in a process of resizing the original image in response to detecting the scaling operation on the first image, so as to obtain the second image;

convert a color value of a pixel unit in the resized original image to a color value of a target preset color in a preset standard color space, so as to obtain a color-converted original image; and perform the second halftone processing on the color-converted original image according to an error diffusion algorithm, so as to obtain the second image;

wherein the computer instructions are further configured to cause the computer to, for each pixel unit in at least some of pixel units in the resized original image, successively perform operations of:

adjusting the color value of the pixel unit to the color value corresponding to the target preset color according to a color error, wherein the color error is an error between a display color of the pixel unit and the target preset color, and the target preset color is a preset standard color with a greatest similarity to the display color of the pixel unit in a plurality of preset standard colors;

wherein the computer instructions are further configured to cause the computer to:

calculate a similarity between the color value of the pixel unit and a color value of each color in a plurality of preset standard colors;

determine, from the plurality of preset standard colors, a target preset standard color with a greatest similarity to the color value of the pixel unit; and adjust the color value of the pixel unit to a color value corresponding to the target preset standard color; and wherein the pixel unit comprises at least two pixels, and wherein the computer instructions are further configured to cause the computer to, for each preset standard color in the plurality of preset standard colors, successively perform operations of:

calculating a sub-difference value between a grayscale value of each pixel in the at least two pixels and a corresponding grayscale value in the color value of the preset standard color;

determining a difference value between the color value of the pixel unit and the color value of the preset standard color according to the sub-difference value; and determining the similarity between the color value of the pixel unit and the color value of the preset standard color according to the difference value.

* * * * *